(12) United States Patent
Ollikainen et al.

(10) Patent No.: US 8,074,875 B2
(45) Date of Patent: Dec. 13, 2011

(54) METHOD AND TERMINAL FOR PRESENTING IN SPEECH FORMAT PRODUCT DESCRIPTIONS ATTACHABLE TO PRODUCTS

(75) Inventors: Ville Ollikainen, Vihti (FI); Christer Bäckström, Espoo (FI); Pekka Pursula, Espoo (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 804 days.

(21) Appl. No.: 11/577,869

(22) PCT Filed: Oct. 26, 2005

(86) PCT No.: PCT/FI2005/050380
§ 371 (c)(1),
(2), (4) Date: Jul. 30, 2008

(87) PCT Pub. No.: WO2006/045904
PCT Pub. Date: May 4, 2006

(65) Prior Publication Data
US 2008/0283584 A1    Nov. 20, 2008

(30) Foreign Application Priority Data

Oct. 26, 2004 (FI) .................................. 20045404
Aug. 29, 2005 (FI) .................................. 20055455

(51) Int. Cl.
*G06K 5/00* (2006.01)
(52) U.S. Cl. ............................ 235/380; 235/382
(58) Field of Classification Search .................. 235/380, 235/382, 492, 375, 383, 486
See application file for complete search history.

(56) References Cited

U.S. PATENT DOCUMENTS 5,721,421 A    2/1998    Vandonkellar
5,917,174 A    6/1999    Moore et al.
(Continued)

FOREIGN PATENT DOCUMENTS
EP    1460575 A2    9/2002
(Continued)

OTHER PUBLICATIONS

Chokshi, Thorne, McFarlane: "Routes for integrating Auto-ID systems into manufacturing control middleware environments", White Paper, CAM-AUTOID-WH-026, 2003.

(Continued)

*Primary Examiner* — Thien M Le
(74) *Attorney, Agent, or Firm* — Shalom Wertsberger; Saltamar Innovations (57) ABSTRACT

The invention is especially intended for visually impaired persons who are not able to read text printed on products or product containers. With the invented method at least a part of a product description, which corresponds to a bar code read and which is fetched from a product information database, is stored in at least one memory accessible to the terminal. After this, in response to a command ordered by a user of the terminal, the RFID identifier attached to the terminal is read and the product description is presented in speech format so that the information readable in the memory and the RFID identifier is utilized in the presentation. The terminal is preferably a mobile station equipped with a speech synthesizer. A visually impaired person can point with the terminal to one or more products and listen via an audio system of the terminal to the product descriptions related to them. When RFID identifiers are attached to the product, the products need to be pointed to as precisely when reading bar codes. The products are, for example, foodstuff or medicine.

18 Claims, 3 Drawing Sheets

U.S. PATENT DOCUMENTS

| | | | |
|---|---|---|---|
| 6,587,835 B1* | 7/2003 | Treyz et al. | 705/14.64 |
| 7,152,040 B1* | 12/2006 | Hawthorne et al. | 705/16 |
| 2002/0077069 A1 | 6/2002 | Heurtaux | |
| 2002/0113703 A1* | 8/2002 | Moskowitz et al. | 340/568.1 |
| 2002/0121986 A1 | 9/2002 | Krukowski et al. | |
| 2003/0069977 A1 | 4/2003 | Heiden | |
| 2004/0128200 A1 | 7/2004 | Sacks et al. | |
| 2005/0261991 A1* | 11/2005 | Kennamer | 705/28 |
| 2006/0244566 A1* | 11/2006 | Sullivan | 340/10.1 |
| 2006/0278700 A1* | 12/2006 | Gotfried et al. | 235/382 |
| 2008/0114649 A1* | 5/2008 | Swirsky et al. | 705/14 |
| 2008/0228600 A1* | 9/2008 | Treyz et al. | 705/27 |
| 2008/0283584 A1* | 11/2008 | Ollikainen et al. | 235/375 |
| 2009/0112683 A1* | 4/2009 | Hamilton et al. | 705/10 |
| 2010/0320189 A1* | 12/2010 | Buchheit | 219/488 |

FOREIGN PATENT DOCUMENTS

| | | |
|---|---|---|
| EP | 1355258 A2 | 10/2003 |
| FR | 2811106 A | 1/2002 |
| JP | 2002024983 A1 | 1/2002 |
| JP | 2003306186 | 10/2003 |

OTHER PUBLICATIONS http://web.archive.org/web/20030605161406/http://www.witsa.org/awards02/nominees/witsa/SysOpenPres.pdf, ollut julkinen May 6, 2003 (arkistointipalvelu www.archive.org).

\* cited by examiner

METHOD AND TERMINAL FOR PRESENTING IN SPEECH FORMAT PRODUCT DESCRIPTIONS ATTACHABLE TO PRODUCTS

FIELD OF THE INVENTION

The invention relates to presenting product descriptions via an audio system to a user of a terminal. The terminal may be, for example, a mobile station. The invention is especially intended for persons who cannot read by themselves the texts printed on products or product containers. For example, the visually impaired and illiterates are such persons. It would also be of great benefit for persons having certain other physical handicaps. One target user group is the increasing number of elderly, some of whom in addition to gradually losing their ability to read fine print, may eventually suffer from severe reduction in mobility and/or in mental functioning due to dementia.

BACKGROUND OF THE INVENTION

The term "product description" refers to information attached to a product. For example, the product description may include just the name of a product, such as "white bread". Alternatively the product description may correspond to a product specification. Then it might include the following text: "white bread is made of wheat flour, water, yeast, and salt". The product description may also include the following items of information: the brand name, the production date, the purchase date, the date of the end of validity, and/or the length of the validity period for the product.

The invention relates to the bar code technique and the RFID (Radio Frequency Identification) technique; thus these techniques are briefly discussed below.

The bar code technique is especially used in retail stores in which a cashier reads via a bar code reader the bar codes printed on products and a data system used by him/her fetches the prices related to the bar codes and prints the prices and the total sum on the receipt to be given to a customer.

The EAN-13 (European Article Number) bar code, whose 13 numbers specifies a product at a cash terminal, is widely used in Europe. Also a shorter EAN-8 bar code is used in some products. UPC coding, which is similar to the EAN coding, is used in North America. Both types of codes are termed unidimensional codes. There are also so-called two-dimensional codes that include a much greater amount of data compared to unidimensional codes.

The printing of bar codes does not increase significantly the production costs of a container. Therefore, in the future the bar code printed on a container will probably be used for disclosing not only a product code but also other items of information. These items of information may be, for example, the production lot/batch of a product or some other item of information making it easier to identify the product.

The RFID technique is utilized in a number of identifiers that are readable from a distance. In Europe the RFID systems usually use the following frequency bands: below 125 kHz, 13.56 MHz, 869 MHz, and 2.45 GHz.

RFID identifiers can be divided into two main classes: active identifiers and passive identifiers. An active identifier includes the power supply from which its transmitter obtains its energy. A passive identifier obtains its energy from the electromagnetic field. The reading distance for the active identifiers is at most several hundred meters. In contrast, the reading distance for the passive identifiers is at most four meters.

Simple passive RFID identifiers have been used in theft protection systems. For example, in clothes shops the identifiers intended for theft protection are attached to the clothes. Only one bit is required in these RFID identifiers, a bit disclosing whether the product has been paid for or not. If the storage capacity of ten bits is available, it is possible to store an integer number between 0 and 1023 in an RFID identifier. If there is even more storage capacity available, it is possible to store in the RFID identifier a product code, for example.

Compared to a bar code, an RFID identifier comprises the following benefits. For example, it is possible to read the RFID identifier through clothes. The reading of the RFID identifier does not require as precise an alignment for the reading device as the reading of a bar code. The maximum distance for reading the RFID code is greater than that for the bar code. In addition, the RFID identifier is readable even if its surface is dirty.

The invention relates to ways to help visually impaired persons in their everyday tasks. A task may be observing the content of a refrigerator, or observing the content of a food cupboard. A person having normal vision can, for example, read the date of the end of validity printed on a carton of milk, but a visually impaired person cannot do so without assistance. It is possible to store the date of the end of the validity in a bar code, but the use of a bar code reader is quite difficult for the visually impaired person even when the bar code reader announces with an audio signal that the reading of the bar code was successful.

If the bar code does not disclose the date of the end of validity, it is possible to determine on the basis of the purchase date whether the product is still valid or not. For example, yoghurt which was bought two months ago and has been forgotten in the refrigerator is probably spoilt. An RFID identifier would obtain from the storing means the date of the end of validity or for some other type of product description, but because of high prices of the RFID identifiers they are not yet attached to the products on sale in retail stores.

One drawback of the prior art techniques can be considered the fact that the visible impaired find it difficult or impossible to read product descriptions.

By means of the prior art, it is possible to fetch product information from a data communication network. For example, it is possible to fetch the price information of products. The publication U.S. Pat. No. 5,721,421 presents a method whereby a bar code of a product is read via a bar code reader and transformed into a product code having a binary form. In order to detect and fix possible data communication errors, a check code is added to the product code after which the product code is sent as a wireless signal to a terminal. Then the product code is sent from the terminal as a radio frequency signal to a server, and in response to this radio frequency signal the server sends the product price to the terminal.

This patent application is based on the applicant's earlier patent application FI20045404 filed in Oct. 26, 2004.

SUMMARY OF THE INVENTION

The invention is based on an idea combining a number of known technical solutions which results in an entity by means of which a visually impaired or illiterate person can obtain the product description of a product. In more detail, by using the method or terminal in accordance with the invention, the person can hear the product description.

The method comprises the steps for getting the product description to a terminal, for example, to a mobile terminal. At first a bar code printed on the product is read. A camera in the mobile terminal, for example, can read the bar code when a bar code reading program is installed in the terminal. The bar code information thus obtained from the bar code located on the product is sent from the terminal to a product information server. At the product information server, the product description corresponding to the bar code is fetched from a product information database and sent to the terminal. Next, the following steps related to the invention are performed. At least part of the product description information is stored in at least one data storage means or memory unit used by the terminal, and in response to a command ordered by a user of the terminal, an RFID identifier attached to a product is read and the product description related to the product is presented in speech format so that the information readable from the data storage and from the RFID identifier is utilized in the presentation.

In addition, the information fetched from the product information server can be stored in the memory of the terminal in case the same information is needed in the future. Before product information is fetched, it is first checked whether the information has already been stored in the terminal's own memory. The memory of the terminal is preferably non-volatile and should include the information related to the most common products. Then the storing of product information can be performed also in situations in which connections to the external product information server cannot be established for some reason.

In addition to the method, the invention comprises two different terminals through which a visually impaired or illiterate person can listen to the product descriptions. The terminal is preferably a mobile station equipped with a speech synthesizer. The person can point with the terminal to one or more products and listen via the audio system to the product descriptions attached to the products.

Compared to known technique, the invention involves the following benefit: when pointing to products with a terminal that is able to read RFID identifiers, it is not required that the product are pointed to as precisely as when pointing with a bar code reader.

BRIEF DESCRIPTION OF THE DRAWINGS

The invention is described more closely with reference to the accompanying drawings, in which.

DETAILED DESCRIPTION OF THE INVENTION

The method comprises three different embodiments which, however, include the same steps shown in the following figure.

Figure 1:
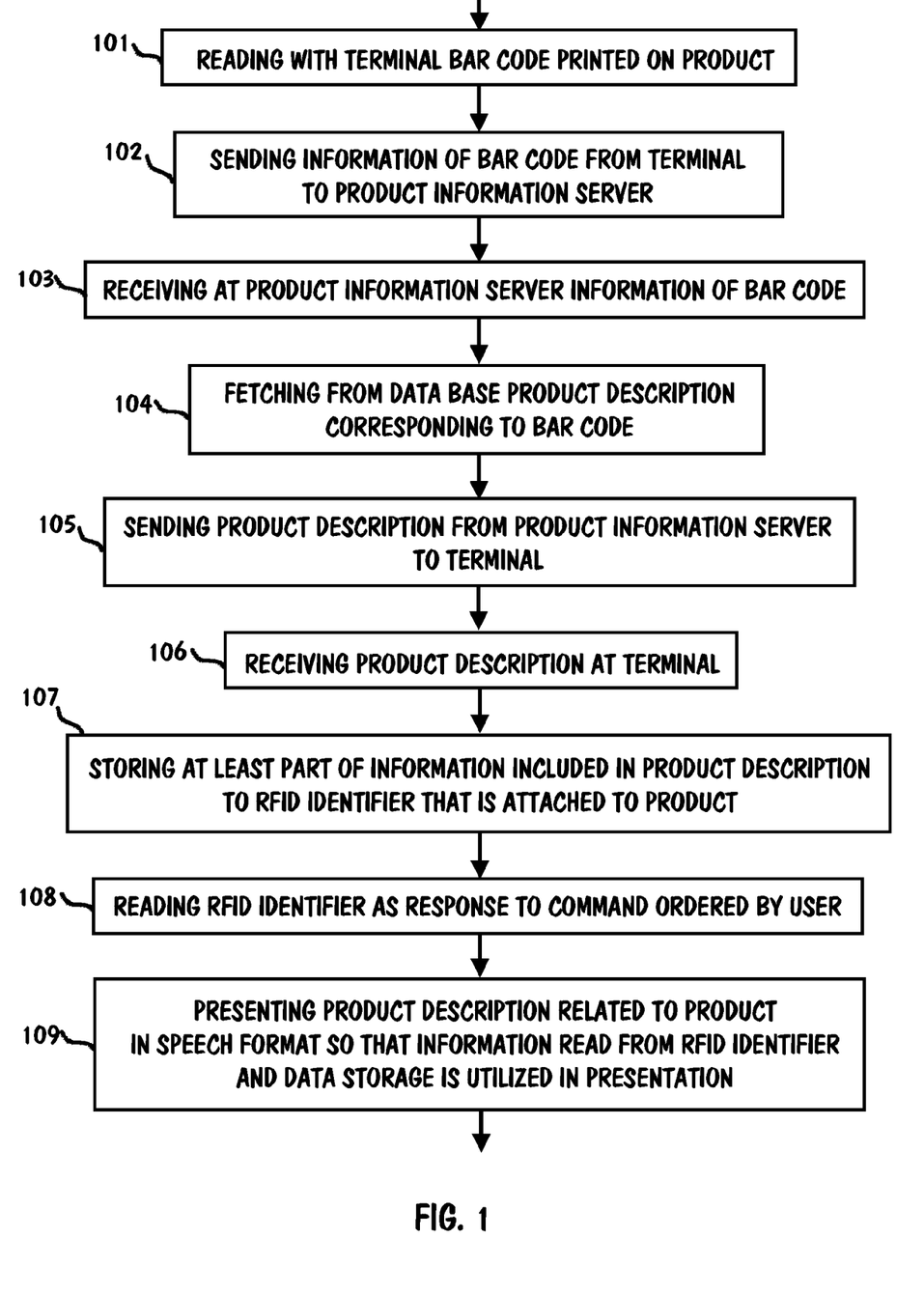
FIG. 1 shows a method for attaching product descriptions to products and presenting the product descriptions in speech format to users.

FIG. 1 shows a method for attaching product descriptions to products and presenting the product descriptions in speech format to users. The method includes the steps of reading 101 with a terminal a bar code attached to a product, sending 102 information in the bar code from the terminal to a product information server, receiving 103 the information in the bar code at the product information server, fetching 104 the product description corresponding to the bar code from a database of the product information server, sending 105 the product description from the product information server to the terminal, and receiving 106 the product description at the terminal. The information sent in step 102 discloses the bar code of the product in a form which the product information server is adapted to read. In addition to the above-mentioned steps that are known as such, the method includes the steps of storing 107 at least part of the information received in step 106 in an RFID identifier attached to a product. In more detail, the RFID identifier is attached to the product whose bar code was read in step 101. Then at least a part of the information of the product information is stored 108 in at least one memory unit available to the terminal. The last steps in the method are performed in response to a command ordered by a user of the terminal. If the user of the terminal is visually impaired, we may assume that he/she has ordered the above-mentioned command because he/she wants to find out the contents of his/her cupboard or refrigerator. Next, in step 109 the RFID identifier attached to the product is read, and in step 110 the product description attached to the product is read out in speech format whereby the information read from the data storage means and the RFID identifier is utilized in the presentation.

The product to which the RFID identifier is attached may be, for example, foodstuff. Food tends to get spoilt. For this reason the method preferably includes a step in which before storing the product description one of the following items of information is added to the product information: the purchase date, the date of the end of validity, and/or the length of the validity period for the product.

The product may be a carton of milk, for example. When the carton is empty, it is removed from the refrigerator and replaced with a full carton of milk. The user confirms by pointing the terminal to the bar code on the new container that the new and old products are identical. In order to avoid losing the RFID attached to the carton of milk, or to another product, the RFID identifier is preferably such that it can be detached and then attached to another individual product, for example, to a full carton of milk. The identifier may include a multifold-purpose sticker for attaching the identifier to the product. Alternatively, it is possible to glue a small-sized disposable plastic pocket to the product and to place the RFID identifier in this pocket. The user then points with his/her terminal the new container in order to update the dates of the product. In addition to the above-mentioned examples, there are other known and probable ways to attach the identifier to the product.

The terms "RFID identifier" and "data storage" are used in the following text related to FIG. 1.

In the first embodiment of the method, the "RFID identifier" and the "data storage means" are the same device. Then the terminal should include the RFID equipment, or it should be connectable to RFID equipment which is able to read and write RFID identifiers. In addition, the RFID identifiers should have adequate storage capacity. We may assume that each product description includes at least the name of the product such as "milk". As is well known, there are different types of milk, such as "low fat milk" or "fat-free milk". There are also other products of different types, such as bread and cheese. Therefore the specific name of a product may be long and thus require quite a lot of storage capacity. Storage capacity is especially needed when an RFID identifier contains other information besides the code number, such as the product name, the brand name, the production date, the purchase date, the date the identifier was written, the date of the end of validity, and/or the length of the validity period for the product.

In the second embodiment of the method the RFID identifier and the data storage means are separate. Then the terminal is adapted a) to read a so-called search key contained in the RFID identifier and b) to fetch by means of the search key the information that is included in the product description. The search key is preferably a product code or a code permanently stored in the RFID identifier. In principle, the search key is any character string that identifies the product description of a certain product. In the second embodiment of the method the data storage means is a memory unit located in the terminal, or a memory unit located in an external device and usable by the terminal. In the second embodiment of the method the information related to the product description is stored in the RFID identifier as well as in another data storage means/memory unit. Then the RFID equipment must be able to read as well as write RFID identifiers.

The third embodiment of the invention differs from the method shown in FIG. 1. In this embodiment the RFID identifier and the data storage means/memory unit are different devices, but the information related to the product description is stored only in the data storage means/memory unit. In the third embodiment of the invention, step 107 shown in FIG. 1 is replaced by a step in which the RFID identifier is attached to the product description received in step 106, i.e. an item of information which is readable from the RFID identifier, termed "search key", is stored in the data storage means together with the product description. The data storage means is a memory card, for example. Then in step 108 the search key is obtained from the RFID identifier. In step 109 the appropriate item of information is read from the data storage means, i.e. the item of information that was attached to the product description in step 106.

Each RFID identifier must include a unique search key. In more detail, those RFID identifiers which are read by the same terminal should include search keys differing from one another. By using ten bits it is possible to code 1024 different bit strings for a maximum of 1024 unique search keys. Then 1024 different products/articles can be managed by the method which is an adequate number of products/articles in most households. Thus, the bit string stored in the RFID identifier is used as a search key when fetching a product description from a data storage means/memory.

Figure 2A:
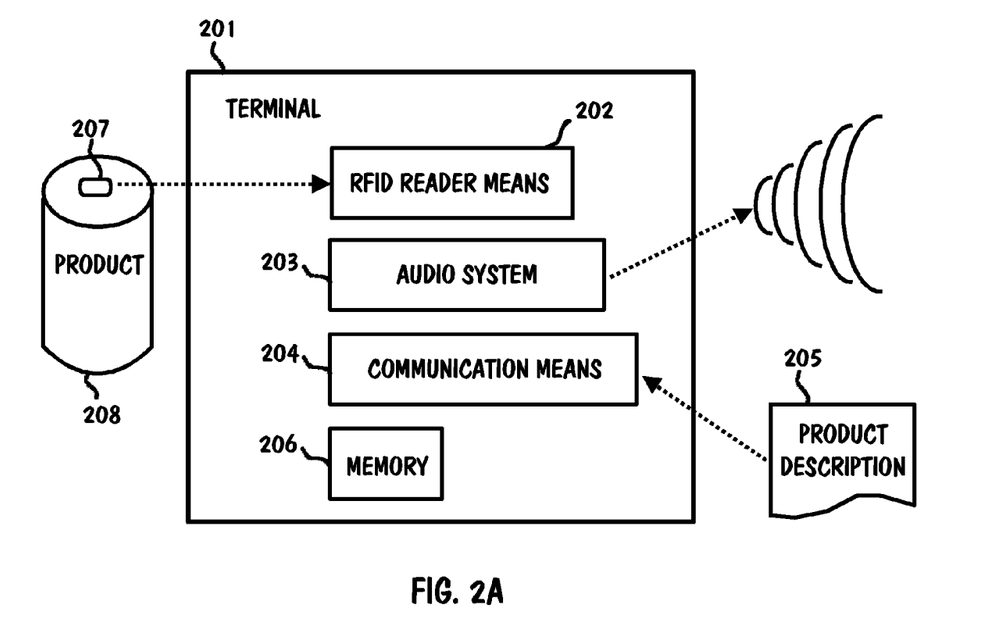
FIG. 2A shows a terminal in accordance with the invention, a terminal using RFID equipment capable of reading.
Figure 2B:
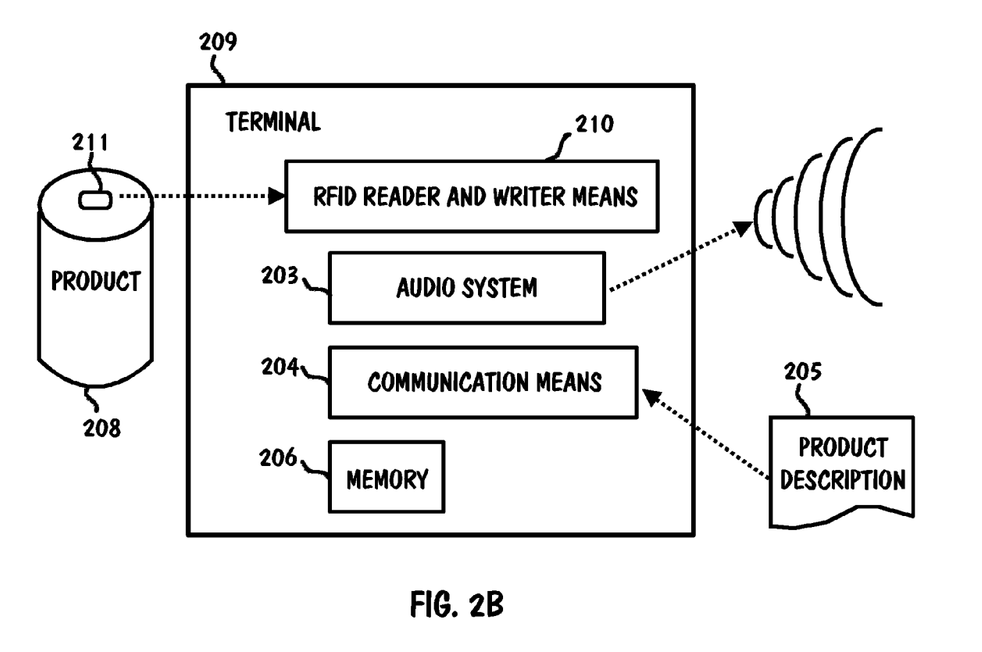
FIG. 2B shows another terminal in accordance with the invention, a terminal using RFID equipment capable of reading and writing.

In addition to the method, the invention comprises two different terminals. FIG. 2A shows a terminal that is adapted to operate in accordance with the third embodiment of the invention. FIG. 2B shows a terminal adapted to operate in accordance with either the second or the third embodiment of the invention.

FIG. 2A shows a terminal adapted to attach product descriptions to products and present the product descriptions in speech format to users, whereby each product description includes at least one product name. This terminal 201 includes or is connectable to RFID equipment 202 capable of reading RFID identifiers, an audio system 203, and communication means 204 operable in at least one of the following networks: a mobile radio network, the Internet, or a local area network (LAN). The terminal 201 has been adapted to receive via the communication means 204 the product description 205, to read through the RFID equipment 202 the search key included in the RFID identifier, and to store the information included in the product description with the search key to in a memory 206 usable by the terminal 201. In response to the command ordered by a user of the terminal 201, the terminal is also adapted a) to read the search key contained in the RFID identifier 207 attachable to the product 208, b) to fetch by means of the search key the stored information from the memory 206, and, c) by utilizing the fetched information, to present in speech format via the audio system 203 the product description 205 related to the product 208.

In FIG. 2A the RFID equipment 202 is able to read RFID identifiers, but it is not able to write product descriptions for the RFID identifiers. The terminal 201 attaches the search key, which has been obtained from the RFID identifier, to the product description of a certain product. The attachment of the search key is performed when the terminal stores the search key and the information included in the product description 205 in the memory 206.

FIG. 2B shows a terminal adapted to attach product descriptions to products and to present the product descriptions in speech format to users, whereby each product description includes at least the name of the product. The terminal 209 includes or can be connected to the RFID equipment 210 able to read and write, an audio system 203, and communication means 204 operable 04 in at least one of the following networks: a mobile radio network, the Internet, or a local area network (LAN). The terminal 209 is adapted to receive through the communication means 204 the product description 205 and to store by means of the RFID equipment at least a part of the information of the product description in the RFID identifier 211 attachable to the product 208. In response to the command ordered by a user of the terminal 209, the terminal is also adapted to read by means of the RFID equipment 210 the information stored in the RFID identifier 211, and to present via the audio system 203 the product description 205 related to the product 208 in speech format so that at least the information contained in the RFID identifier 211 is utilized in the presentation.

In the above, the terminal 209 shown in FIG. 2B is adapted to operate in accordance with the first embodiment of the method. Alternatively, the terminal 209 can be adapted to operate in accordance with the second embodiment of the method. Then the terminal 209 has been adapted to store at least a part of the information of the product description 205 in a memory 206 accessible to the terminal, and to read the information thus stored in the memory 206. There are two alternatives for implementing the memory. In the first alternative the terminal 209 includes the memory 206. In the second alternative the memory 206 is placed at least partly outside of the terminal 209, and the terminal is adapted to access the memory through its communication means 204.

The following features of the terminal can be included in the terminal 201 shown in FIG. 2A, as well as in the terminal 209 shown in FIG. 2B.

Figure 3:
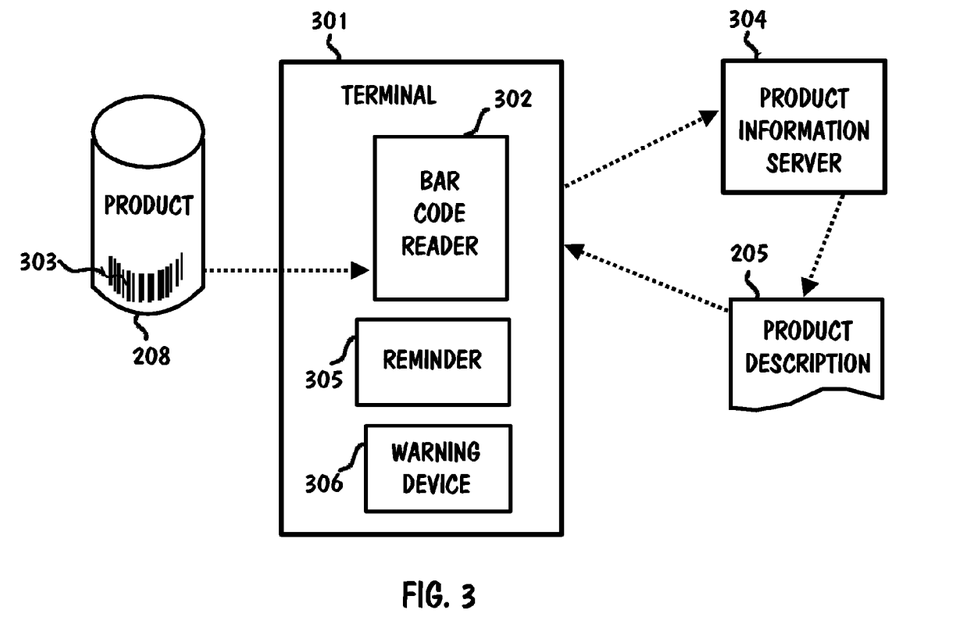
FIG. 3 shows additional features of the terminal.

FIG. 3 shows additional terminal features. The terminal 301 is the terminal 201 shown in FIG. 2A or the terminal 209 shown in FIG. 2B. The terminal (201, 209) is adapted to add through the communication means 204 (shown in FIGS. 2A and 2b) at least one of the following items of information to the product description 205: the production date, the purchase date of the product 208, the date of the end of validity, and/or the length of the validity period for the product. In addition or alternatively, the terminal (201, 209) is equipped with a bar code reader 302 by means of which the terminal is adapted to read the bar code 303 printed on the product 208. The terminal (201, 209) is preferably adapted to announce to the user when the bar code reader 302 is aligned so that the bar code 303 printed on the product 208 is readable. The camera of the terminal (201, 209) the can be adapted to be used as the bar code reader 302. The terminal (201, 209) is adapted to send via the communication means 204 the bar code information obtained from the product 208 to the product information server 304, and to receive the product description 205 which corresponds to the bar code 303 and which is sent from the product information server 304. Another possible additional feature of the terminal 301 is related to ways to remind a terminal user. Then the terminal 301 is equipped with reminder means 305 enabling the terminal to remind the user, for example, to take certain medicine. The terminal 301 is adapted to remind the user of the terminal 301 via its reminder means 305 about a need to use the product 208, the need being determined by the dosage guidelines included in the product description 205. In the case of medicine, a part of the product information can be obtained from prescriptions that are stored in electronic form. A third possible additional feature of the terminal 301 is related to warning the user of the terminal. Then the terminal 301 is equipped with a warning device 306 enabling the terminal to warn the user about a risk of the joint use of two or more products. As is well known, some products/medicines should not be used at the same time. The terminal 301 is adapted to warn via its warning device 306 the user of the terminal 301 about the risk of joint use related to the product 208, the content of the warning being determined on the basis of the product description of the product 208 and of at least one other product description which is stored in the memory 206. As mentioned above, the terminal is able to access the memory 206. The memory is not necessarily the terminal's own memory, but as mentioned in the text relating to FIGS. 2A and 2B, the terminal is able to use the memory 206. In order to avoid possible data communication problems, the memory 206 is preferably located in the terminal. If access to the memory 206, however, requires use of the public network, this results in data communication costs. The data communication costs are essentially reduced if the previously fetched product descriptions are permanently stored in the terminal's own memory, or in a memory which the terminal is able to read through a LAN or a corresponding network.

The terminal (201, 209) is usually one of the following devices: a mobile station, a PDA (Personal Digital Assistant), a hand-held computer, a portable computer, or a desktop computer, but it may be some other device. The terminal (201, 209) should include or it should be connectable to the following means: a data storage(s)/memory, RFID reading means, an audio system, and communication means operable in a communication network, in the Internet, or in a LAN.

It should be noted that with the exception of updated dates the product information attached to the product needs to be fetched only once, if there is enough storage capacity available. Let us assume that a person uses the bar code reader 302 in order to read the bar code of a carton of milk. When the bar code is read, the terminal fetches through its communication means 204 the product description and stores it. Because the RFID identifier is detachable, the product description, or the search key attached to it, is transferred from the empty carton of milk to the full carton of milk. If a person buys a product and the person does not yet have an RFID identifier for the bought product, the product description for this product must be fetched from the product information server.

Thus the bar code reader 302 is needed when the product description related to the bar code is fetched from the product information server. In addition, the bar code reader is useful when a visually impaired person tries to identify products to which RFID identifiers are not yet attached. For example, one liter carton of milk is very similar to one liter carton of yoghurt, i.e. it is difficult to distinguish those cartons on the basis of the sense of touch. The bar code reader 302 co-operates with the audio system 203 so that a user of the terminal hears via the audio system the product description related to a certain bar code. In more detail, the visually impaired person may ensure by means of the bar code reader that the carton to which he/she is attaching the RFID identifier is a carton of milk, not a carton of yoghurt.

The audio system 203 connectable to the terminal 201 and/or the terminal 209 preferably includes a speech synthesizer. The speech synthesizer may be an application stored in the memory 206 of the terminal, or off-line equipment generating speech audible through the audio system. The content of the speech is typically the name of the product or the product description, but with the speech generator speech it is possible to generate having other content.

Alternatively, the audio system 203 repeats a voice file stored in the memory 206. If the product description 205 sent by the product information server is in text format, the product description 205 can be converted to a voice file by using the speech synthesizer. Then the audio system 203 presents the voice file to a user of the terminal as audible speech.

The audio system 203 preferably includes a signal device. The signal device generates sounds which guide a user of the terminal when he/she is trying to point to a certain product with the bar code reader 202 or with the RFID reader and writer 210. The signal device may disclose by means of a certain repetitive (periodic) signal that the reading of a bar code or an RFID identifier was partly successful. Silence would indicate that the reading is currently not possible, and a continuous (aperiodic) signal would indicate that the reading has been completed.

Figure 4A:
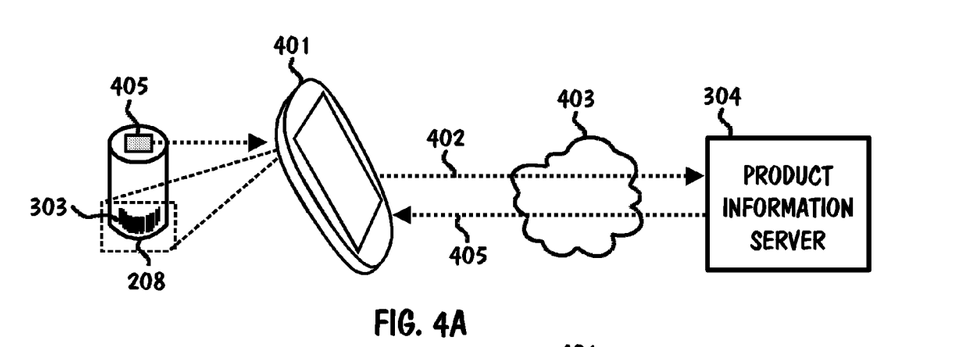
FIG. 4A shows an example of the use of a bar code reader, the fetching of a product description from a product information server, and the storing of the product description.

FIG. 4A shows an example of the use of a bar code reader. It also shows an example of the fetching of a product description from the product information server. A visually impaired person has a terminal 401 equipped with a camera which operates as a bar code reader 302. The visually impaired person is able to read the bar code 303 printed on the product 208 by using the camera of the terminal 401 and a signal device. Let us assume that the product 208 is a bottle of medicine which the visually impaired has bought in a pharmacy. When he/she succeeding using the terminal to read the bar code on the medicine bottle, the terminal 401 sends a certain number string corresponding to the bar code 303 as a text message 402 via the mobile radio network 403 to the product information server 304. In response to the text message 402, the product information server 304 sends to the terminal 401 a text message 404 that includes the name and the dosage guidelines. In other words, the name and the dosage guidelines are examples of a product description. The terminal 401 discloses with a specific sound signal that the text message 404 has been received. The visually impaired person attaches an RFID identifier 405 to the medicine bottle 208 and pushes a certain button on the terminal 401. The button may be placed on a touch screen, and when touched it may give a haptic response that can be felt with the finger. The terminal 401 reads by means of the RFID reader a code which is permanently stored in the RFID identifier 405 and which has been termed a search key. Then the terminal stores the search key and the product description obtained from the text message 404 into the memory of the terminal 401.

Figure 4B:
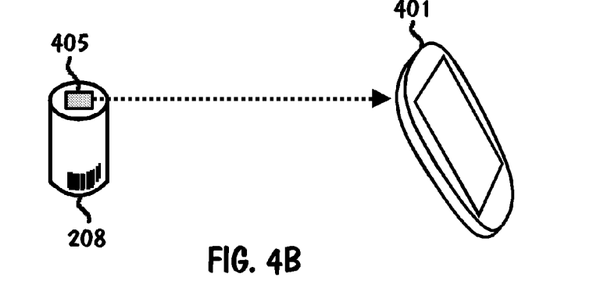
FIG. 4B illustrates an example of the reading of a product description by means of the RFID identifier.

FIG. 4B shows an example of the reading of a product description by means of the RFID reader. Let us assume that as shown in FIG. 4A a visually impaired person has stored a product description in the memory of the terminal. When the visually impaired person pushes a button on the terminal 401 which starts the RFID reader of the terminal, the terminal reads a search key from the RFID identifier 405 attached to the medicine bottle 208 and fetches by means of the search key a product description stored in the memory of the terminal 401. The product description includes the name of the medicine 208 and the dosage guidelines. The visually impaired person hears the name of the medicine 208 and the dosage guidelines through the audio system of the terminal 401.

By using the known multiread feature it is possible to read simultaneously a number of RFID identifiers. For example, the multiread feature is useful when a visually impaired person wants to find out the content of his/her refrigerator or medicine cabinet. When the refrigerator or the medicine cabinet include a number of products with RFID identifiers, all the RFID identifiers, or at least most of them, can be read by the multiread feature of the RFID reader. Then the information read in the RFID identifiers can be delivered item by item or in a list format to the visually impaired person or to the terminal used by him/her.

It is possible to implement on the basis of FIG. 3 a device which is similar to the terminal 301 and which can be termed a "reminder".

A reminder is intended to present by signals and/or in speech format usage needs for users, wherein each product description of a product includes at least the name of the product and the dosage guidelines and wherein the reminder includes or is connectable to an audio system, communication means, a memory, a clock, and to at least one of the following reading devices: a RFID reader and/or a bar code reader, This reminder is adapted to read with its reader means the code attached to a product and to search via the communication means for a product description stored in the product database, the database search being based on the code read. In addition, the reminder is adapted to store the dosage guidelines related to the searched product description in the memory available to the reminder, and by means of a clock and reference to the dosage guidelines stored in the memory to remind a user about a need to use the product. The product is preferably medicine.

Nowadays it is a trend that prescription drugs are bought on a self-service basis. The compatibility of medicines is not always obvious. There are a number of cases when medicine 'A' should not be used together with medicine 'B'. As regards certain illnesses and drugs, there exist corresponding counterindications. Such warnings are usually printed in small-sized font on an informative label placed in medicine container. Especially poor-sighted persons find it difficult to read the small-sized text. When the bar code 303 is read on the container of a drug, it is possible to simultaneously check via the product description server (304) whether there are reports about counterindications that limit the simultaneous use of drugs and to inform the user if there are such reports.

Pharmaca Fennica is an example of a Finnish database for drugs that can be used as an information source for the product information server 304. An RFID identifier is not necessary for warning about incompatibilities. It is also possible to check before a purchasing decision is made, if the information in the memory 206 is already available to the terminal (201, 209).

On the basis of the above text and FIG. 3, it is possible to implement a device which is similar to the terminal 301 and can be called a "warning device".

The warning device is intended for presenting the counter-indicative risk of one or more products in speech format to users, each product description including at least the name of the product and the warning device including or being connectable to an audio system, communication means, and at least one of the following readers: an RFID reader and/or a bar code reader.

This warning device is adapted to read with its reader a code attached to the product and to search via the communication means the product description stored in the product information database, the database search being based on the code read. The warning device is adapted to store the information included in the product description in the memory accessible to the warning device and to compare that information to other information included in at least one product description which has been read earlier. When the comparison discloses that an incompatibility risk for the products exists, the warning device is adapted to warn about the risk. The products may be especially drugs.

In addition to the descriptions and the examples shown above the method and terminal in accordance with the invention can be implemented in various ways which are, however, obvious to a person skilled in the art because of the person's professional ability and the ideas described in this patent application.

The invention is defined in the following claims concerning the method and the terminal.

The invention claimed is:

1. A method for associating a product description with a product and presenting the product description in speech format to a user, the method comprising the steps of:
   utilizing a terminal, reading a bar code printed on a product;
   sending the bar code information to a product information server;
   at the product information server:
   receiving the bar code information;
   fetching the product description associated with the bar code;
   sending the product description from the product information server to the terminal;
   at the terminal:
   receiving the product description;
   storing product information in an RFID identifier accessible by the terminal, the product information comprising at least part of the product description, or information related thereto;
   in response to a user command:
   reading an RFID identifier associated with the product; and,
   presenting the product information associated with the product in speech format, so that information which was read from the RFID identifier is utilized in the presentation.

2. The method as in claim 1, further comprising the step of adding to the product information at least one of the following items:
   product production date, product purchase date, RFID identifier writing date, product expiration date, and product expiration period.

3. The method as in claim 1, wherein the RFID identifier is detachable from the product and attachable to another product.

4. The method as in claim 1, further comprising the step of adding to the product information at least one of the following items:
   product production date, product purchase date, RFID identifier writing date, product expiration date, and product expiration period.

5. The method as in claim 1, wherein the RFID identifier is detachable from the product and attachable to another product.

6. A method for associating a product description with a product and presenting the product description in speech format to a user, the method comprising the steps of:

utilizing a terminal, reading a bar code printed on a product, sending the bar code information to a product information server, at the product information server:

receiving the bar code information;

fetching the product description associated with the bar code;

sending the product description from the product information server to the terminal;

at the terminal:

receiving the product description;

storing product information in a data storage accessible by the terminal, and in response to a command ordered by a user, the product information comprising at least part of the product description, or information related thereto;

in response to a user command:

reading a search key from a RFID identifier attached to the product;

fetching product information associated with the search key from the data storage; and, presenting the product information associated with the product in speech format.

7. A terminal for associating a product description with a product, and presenting the product description in speech format to a user, the terminal comprising:

an audio system;

a bar code reader for reading a bar code from the product;

a communications module operable in at least one of the following networks: a mobile network, the Internet, or a LAN (local area network), the communication module being constructed to send bar code information, and receive the product description;

a RFID identifier reader capable of reading a search key from an RFID identifier;

a memory accessible to the terminal, for storing at least a search key and product information associated therewith, the product information comprising at least a portion of the product description or information related thereto;

a user command module constructed to receive a user command, and responsive thereto, cause the terminal to read a search key from a RFID identifier associated with the product or coupled thereto; fetch from the memory the product information associated with the search key; and present the fetched product information in an audio format, via the audio system.

8. The terminal as in claim 7, wherein the memory is embedded in the terminal.

9. The terminal as in claim 7, wherein the memory is at least partly situated outside of the terminal and the terminal is constructed to access the memory through the communication module.

10. The terminal as in claim 7, wherein the terminal is further constructed to add to the product information at least one of the following items: product production date, product purchase date, RFID identifier writing date, product expiration date, and product expiration period.

11. The terminal as in claim 7, further comprising a reminder module for reminding a user of a need for the product, the need being determined on the basis of dosage guidelines included in the product description.

12. The terminal as in claim 11, wherein at least a part of the product description originates from a medical prescription stored in electronic form.

13. The terminal as in claim 7, further comprising a warning device warning a user about a counterindicative risk of the product, the risk being determined on the basis of the product description and at least one other product description stored in the memory.

14. The terminal as in claim 7, wherein the terminal is further constructed to inform a user when the bar code reader is aligned so that the bar code is readable.

15. The terminal as in claim 7, wherein the bar code reader is a camera.

16. The terminal as in claim 7, wherein the terminal is one of the following devices: a mobile station, a PDA (Personal Digital Assistant), a hand-held computer, a portable computer, or a desktop computer.

17. A terminal for associating a product description with a product, and presenting the product description in speech format to a user, the terminal comprising:

an audio system;

a bar code reader for reading a bar code from the product;

a communications module operable in at least one of the following networks: a mobile network, the Internet, or a LAN (local area network), the communication module being constructed to send bar code information, and receive the product description;

a RFID identifier reader capable of writing product information into a RFID identifier coupled to a product, and of reading the product information from the RFID identifier, the product information comprising at least a portion of the product description or information related thereto;

a user command module constructed to receive a user command, and responsive thereto, cause the terminal to read product information from the RFID identifier; and present the fetched product information in an audio format, via the audio system.

18. The terminal as in claim 17, further comprising memory embedded therein or coupled thereto, for storing at least part of the information of the product description.

* * * * *